Patented June 15, 1937

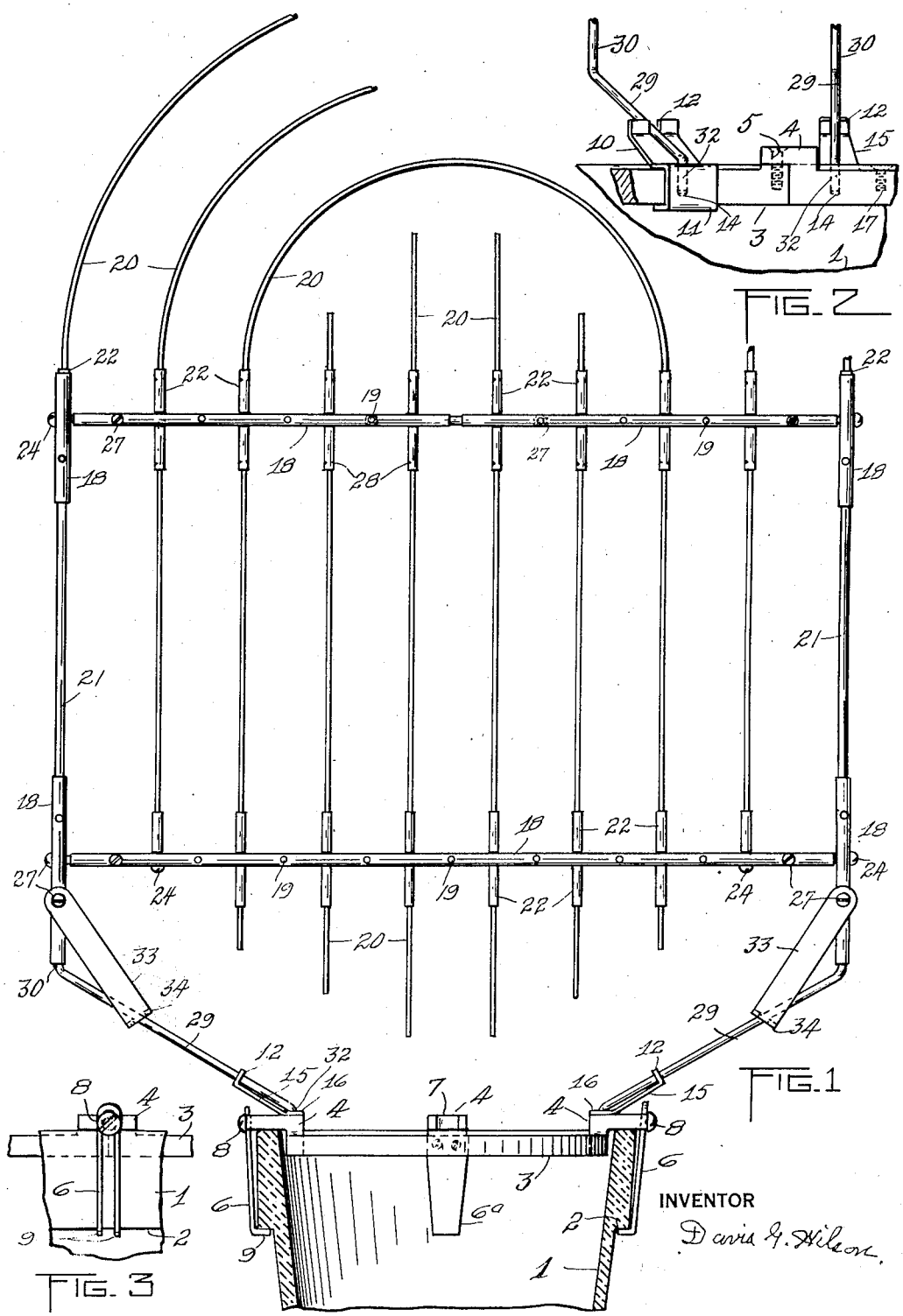
June 15, 1937.  D. G. WILSON  2,083,678
PLANT SUPPORT AND TRELLIS
Filed Oct. 9, 1936  2 Sheets-Sheet 1
INVENTOR
David G. Wilson June 15, 1937.  D. G. WILSON  2,083,678
PLANT SUPPORT AND TRELLIS
Filed Oct. 9, 1936  2 Sheets-Sheet 2
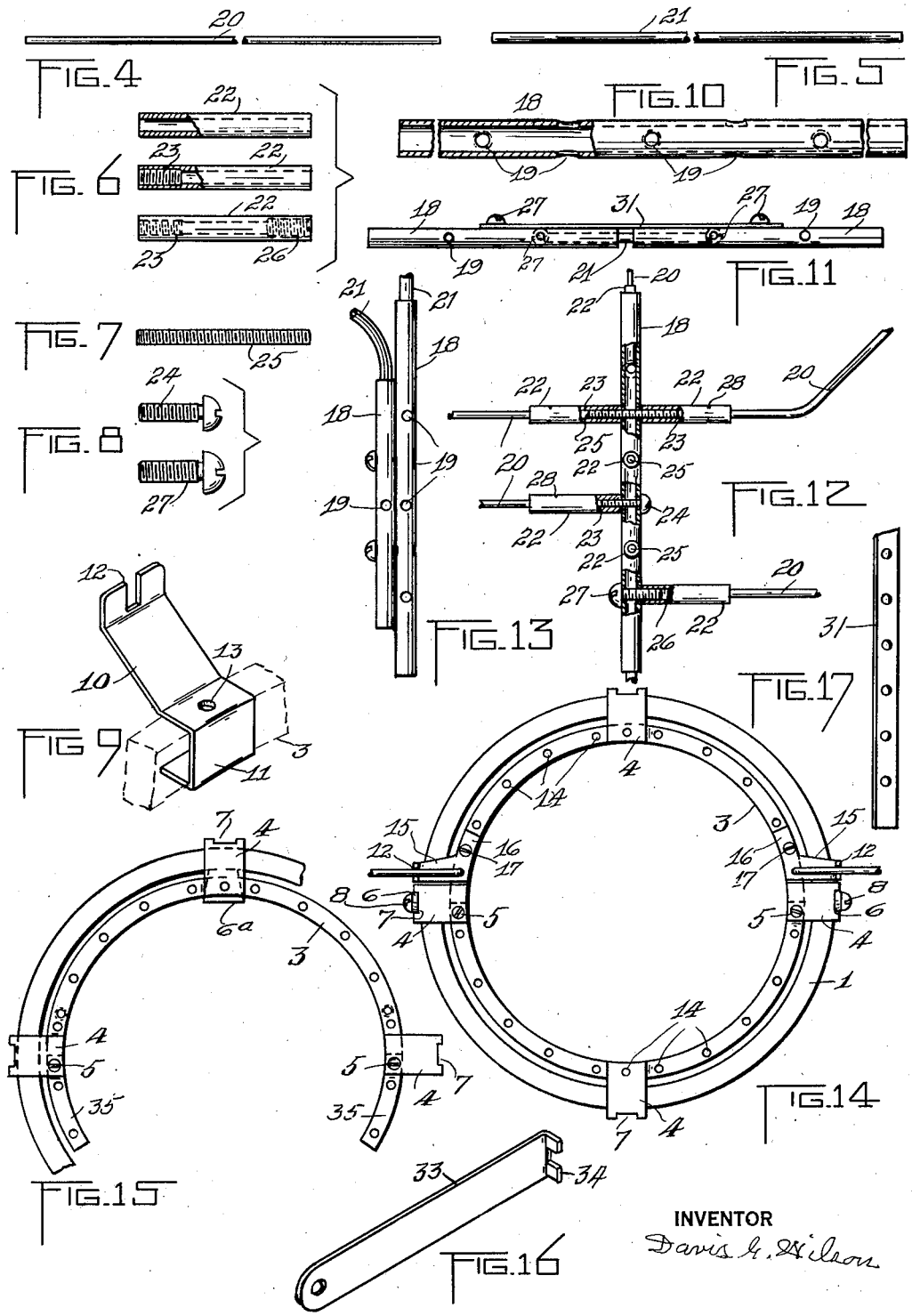

2,083,678

UNITED STATES PATENT OFFICE 2,083,678

PLANT SUPPORT AND TRELLIS

Davis G. Wilson, Rochester, N. Y.

Application October 9, 1936, Serial No. 104,859

19 Claims. (Cl. 47—47)

The present invention relates to the floral art and more particularly to the growing of potted vines and other plants, an object thereof being the provision of an ingeniously constructed trellis which may be added to from time to time as the plant grows, starting from the lowest point at which the plant needs support to run and climb and being extended in any direction and to any reasonable height and breadth.

While it has heretofore been suggested to provide a trellis formed of wire and detachably secured to a flow-pot, as an improvement to the make-shift devices such as sticks and wires stuck into the soil within the pot, this invention has as another object the provision of a still further improvement in the art by making use of a base member conformed to the inner face of the pot or container wall and detachably secured thereto and, by the use of wire of different diameters and cut to various lengths, together with brace members, coupling sleeves, connecting sections and fastening devices, to build upon such base a trellis of any preferred design and configuration.

Another object of the invention is the provision of a trellis consisting of a supporting base and construction units, as herein above mentioned, whereby one or a plurality of frame members of arched or angular shape may be erected upon the base in any direction relatively thereto and to each other, the frame or frames including, if desired, grid portions and lateral extensions.

A further object of the invention is, by having the unit parts removable and interchangeable, to make provision whereby a dead branch or runner of a plant may be cut away and that part of the trellis to which it has clung removed and, if the plant springs another shoot, a support therefor may be added to the trellis.

And, a still further object of the invention is the provision of a new and useful article of manufacture consisting of a trellis-set including the base or supporting member, interchangeable construction units and fastening devices, the set being furnished in knock-down condition and the trellis being built up or assembled by the purchaser.

To these and other ends the invention consists of certain parts and combinations of parts as will be fully set forth in the following description and particularly defined in the appended claims.

The accompanying drawings illustrating the invention and forming a part of the specification are as follows:

Figure 1 is a view in front elevation of a trellis attached to a flower-pot, parts of the trellis being broken away and the pot being shown in vertical central section.

Fig. 2 is a fragmentary detail in side view showing the lower portions of two trellises erected upon a single base.

Fig. 3 is a front view of one of the clamping members seen in Fig. 1.

Figs. 4 and 5 show in detail wires used in constructing a trellis.

Fig. 6 shows partly in side view and partly in section various modifications of the connecting sleeve.

Fig. 7 is the stud member.

Fig. 8 shows the bolts employed as fastening devices.

Fig. 9 shows in perspective one of the movable support-arms or braces.

Fig. 10 is a partial side view and partial longitudinal section of one of the tubular connectors.

Fig. 11 shows in side view an assembly of parts as will be explained.

Fig. 12 is a plan view, with parts shown in section, illustrating the manner of assembling certain of the unit parts.

Fig. 13 is a fragmentary side view of another assembly of parts.

Fig. 14 is a top plan view of the supporting base and container seen in Fig. 1.

Fig. 15 is a similar view showing a modification of the base.

Fig. 16 shows in perspective another form of brace member.

And, Fig. 17 shows a fragmentary portion of a perforated connecting strip.

In the drawings similar reference numerals refer to similar parts throughout the several views.

Although the invention may be adapted for use with containers of various shapes and sizes, that shown at 1 in the illustrated embodiment thereof is the ordinary circular flower-pot on the wall of which is formed the exterior annular shoulder 2. The base or supporting member upon which the trellis is erected is, in this instance, a split ring 3 rectangular in cross section and formed with outwardly extending lugs 4 which rest upon the upper edge of the pot. There are preferably four of these lugs equally spaced and lying in a plane above that of the ring so that the upper face of the latter will be below the edge of the pot for the dual purpose of partial concealment and to prevent its shedding water over the pot when the soil is irrigated. The adjoining ends of the ring sections are overlapping and held together by screws 5.

While any suitable clamping means may be employed for removably holding the base 3 to the container 1, that shown at 6 in the drawings is a wire bent U-shape with its loop end held in the recessed end face 7 of a lug 4 by a screw 8 threaded into the lug and with its laterally turned free ends 9 engaging under the shoulder 2. At least two of these clamps are used one diametrically opposite the other. The ring or base 3 is, preferably, of sufficiently less diameter than the outer end of the container wall to allow, for a standard size ring, a variation in the size of the pot and, also, a clearance space permitting a knife being used to loosen soil from the wall. To keep the ring 3 properly centered and against accidental side movement clamps 6 or other suitable stop members may also be attached to the other pair of opposing lugs 4. Such stops may, if preferred, be strips 6a of spring metal secured to the inner face of the ring and extended downwardly to engage the inner face of the container wall.

One of the construction units is a supporting arm or brace 10 formed from a metal strip and, when in position, extends outwardly and angularly upward from the base 3, one end of the arm being U-shape as at 11 to slidably engage the base while the outer end is slotted and turned upward as at 12. A trellis-set includes several of these brace members any number of which may be employed and positioned radially on the ring 3, each arm having a perforation 13 which is aligned with a selected one of a ring of regularly spaced drill holes 14 in the upper face of the member 3. In the present instance two of the brace members, as illustrated at 15, are shown minus the portions 11 and instead have their inner ends 16 bent angularly to the arm proper and rigidly secured to the base by screws 17.

Other unit parts of the set and used in erecting the trellis proper upon the base are connector members 18 which may be of one or, if preferred, various lengths, each comprising a tubing through which are a plurality of longitudinally arranged and regularly spaced holes 19, alternate ones being at right angles to each other and the holes, in this instance, being shown as tapped; wire 20 and 21, one of larger gauge than the other and cut to various lengths; and sleeves 22, some of the latter being internally threaded at one end as at 23 to receive a screw 24 or stud 25 having a like thread, others not being threaded at all, and still others having a like thread 23 at one end and at the other end a thread 26 to receive a screw 27 of larger diameter.

The wire 21 and sleeves 22 are of the same diameter and of a size to fit the tubular connectors 18 and the holes 14 in the base 3, the wire 20 being of a diameter to fit within the sleeves 22.

Attention is directed to Fig. 12 which illustrates an assembly of the different parts. A connector 18 may receive in either end a wire 21 or sleeve 22 and the sleeve in turn may act as a reducing member for receiving a smaller wire 20, while one function of a screw 24 or 27 is to act as a stop for a sleeve or wire inserted in the connector. Preferably the connectors 18 are extended at each end beyond the last hole 19 a distance to provide a practically full-length bearing for an inserted sleeve 22. Likewise a stud 25 or one of the wires inserted through aligned holes 19 may act as a stop for an axially inserted wire or sleeve. Lateral extensions from the member 18 are provided by the internally threaded sleeves 22 which are secured to place by screws 24 or 27, the screw 24 having a slip fit through a hole 19 and threading into the smaller tap 23, the screw 27, if used, engaging the thread in the hole 19 and the larger tap 26 in the sleeve, the size of screw used being determined by the type of connection being made. Use of a stud 25 as a fastening device permits aligned axial extensions being made from a connector member 18, one from each side thereof. From the coupling sleeves 22 wires 20 may be extended and bent in any direction, the sleeves being crimped as at 28 if construction necessitates holding the wires from axial movement in the sleeves.

Another detail of assembly is to attach two connectors 18 side by side, as in Fig. 13, and extend wires therefrom in different directions. In Fig. 11 there is shown a perforated strip 31, seen also in detail in Fig. 17, which may be cut to any desired length and by screws 27 secured to members 18 to hold the latter from spreading apart on a wire 21.

From the foregoing it will readily be understood how a trellis may be constructed. As an example refer to Fig. 1 which shows a base member 3 supported on the edge of a flower pot 1 and held thereto at diametrically opposite points by clamps 6. Formed from the larger wire are a pair of obliquely disposed arms 29 the outer and inner ends 30 and 32, respectively, of which are bent vertically in opposite directions, the end 32 of each arm extends through the perforation 13 in a fixed brace member 15 and into the aligned drill hole 14 in the base 3, while the outer end 30 is inserted in a connector 18. These arms 29 rest in the slotted ends 12 of their brace members 15 and are thus held against swinging movement. Then by use of the different construction units a trellis is built up, the parts being added from time to time, if desired, and as the plant or vine grows. Any shape of trellis can be built and parts extended in any direction. Furthermore, if a part of a plant should die the dead member can be cut away and that part of the trellis to which it has clung removed. The plant may be repotted without disengaging it from the trellis by putting a cross-bar at the bottom of the trellis and tying the top parts down so the trellis won't come apart where not securely fastened, and then laying the trellis on a bench and loosening the pot from the soil. Also the trellis being detachable from the base permits its being transferred to a larger one and the plant to a correspondingly larger pot.

Angular portions of a trellis frame may be reinforced against torsional strain by a brace 33 one end of which is secured by a screw 27 to a connector member 18 and the other end formed with a slotted lateral extension 34 for receiving a wire 29 extending angularly from such connector. In the fragmentary assembly shown in Fig. 2 there are shown the bottom frame members or arms 29 of two trellises on a single base 3. It may be added that an arm 29 is held against swinging movement by its brace member 10 and that such member is in turn held against removal from the base 3 by extension of the arm portion through the opening in the brace and into the hole 14.

In Fig. 15 there is shown a modification of the base member 3 in which instead of a complete ring formed of two half sections, two segmental sections 35 of any desired length are secured to the ends of a half ring. In some instances it may be desirable to employ means such as the spring metal strap 6a secured to the base and engaging the wall of the pot for maintaining the base concentric with the pot.

What I claim is:

1. In a device of the character described the combination, with a flower pot or like container, of a base conformed to and supported upon the container wall and having a plurality of openings therein, means for securing the base to the container, a plant supporting member as a wire engaging in a selected one of said openings, and a detachable brace for said member carried by the base, the plant supporting member comprising means for holding said brace against removal.

2. In a device of the character described the combination, with a flower pot or like container, of a base conformed to the inner face of the container wall and having a plurality of openings therein, means for detachably securing the base to the container, a plurality of plant supporting members as wires engaging in selected ones of said openings, and a brace for each of said members, such braces being removably attached to the base by their respective plant supporting members.

3. The combination, with a flower pot or like container and a trellis, of a circular base for supporting the trellis and located within the pot, projections from the base resting on the edge of the pot, and means for clamping the base to the pot, said base comprising a plurality of rigidly connected segmental sections having a series of holes in their upper faces as and for the purpose set forth.

4. The combination with a flower pot and an exterior annular shoulder on the wall thereof, of a ring within the pot as and for the purpose set forth, lugs on said ring resting on the edge of the pot, screws in said lugs, and clamping means comprising wires bent U-shape with their free ends bent inwardly, such free ends engaging the under face of said shoulder and the loop ends of the clamps engaging over said screws.

5. A combination in accordance with claim 4 characterized by the ends of said lugs being recessed to receive said clamps.

6. A combination in accordance with claim 4 characterized by said ring being concentric with and spaced from the wall of the pot, and including additional means on said ring for engaging the wall of the pot to hold the ring centered with respect thereto.

7. The combination with a flower pot, of a ring comprising a base for a plant support and resting on the edge of the pot, such ring having a hole in its upper face, a wire having a bearing in said hole and bent to extend radially of the ring, and a brace member carried by the ring having a slot in its outer end for receiving said wire to prevent its turning in said bearing and an aperture aligned with said hole for receiving said wire, the latter functioning to hold the brace against removal.

8. The combination with a flower pot, of a ring comprising a base for a plant support and resting on the edge of the pot, such ring having a plurality of holes in its upper face, an arm extending radially outward and obliquely upward from the ring and slotted in its outer end, a U-portion on the inner end of said arm for engaging the ring, such arm having an aperture aligned with a selected one of said holes, a wire extending radially from the ring, and engaging in said slot, and a downward extension on the inner end of said wire having bearing in said arm aperture and the aligned hole in the base, the arm holding the wire against rotation in said bearing and the wire holding the arm against removal.

9. In a device of the character and for the purpose set forth, a ring, lugs on said ring for supporting it upon the wall of a flower pot or like container, such ring having a series of spaced holes in its upper face, bracing arms extending radially outward from the ring and slotted in their outer ends, U-portions on said arms engaging the ring, each arm having an aperture, a wire for each of said arms extending radially outward from the ring and engaging in the slot of its respective arm, a downwardly turned inner end on each wire having bearing in the hole of its respective brace and in one of the ring holes, the arms holding the wires from swinging in their bearings and the wires in turn holding the arms on the ring.

10. The combination with a flower pot or like container and a base adapted to rest upon the pot, means for securing the base to the pot, interengaging and interchangeable construction units including wire sections of different diameters, sleeves and laterally apertured tubular connectors for erecting a trellis upon said base, and fastening devices for holding said parts together.

11. The combination with a flower pot or like container and a base adapted to rest upon the pot, means for securing the base to the pot, interengaging and interchangeable construction units including wire sections of different diameters, sleeves, and laterally apertured tubular connectors for erecting a plurality of trellises upon said base at different angles with respect thereto and to each other and to form connections from one trellis to another, and fastening devices for holding the parts of the trellises together.

12. In a device of the character described, a base having openings therein as and for the purpose set forth, and trellis construction units including wires and sleeves of like diameter for entering said openings, tubular connectors of a size to fit said wires and sleeves, smaller wires fitting within said sleeves, some of the sleeves being internally threaded, and fastening means including screws and threaded studs for securing the parts together.

13. In the assembly of a trellis of the character described, a tubular member, a wire in one end of said tube, a sleeve in the other end of the tube, said tube having lateral openings therethrough, and screws threaded in said openings as stops for said wire and said sleeve.

14. In a trellis assembly of the character described, a tubular connector having lateral openings through the wall thereof, a screw threaded through one of said openings, a coupling sleeve threaded on said screw, and a wire in said sleeve.

15. In a trellis assembly of the character described, a tubular connector having lateral openings through the wall thereof, a stud extended through one of said openings, and a sleeve threaded on each end of said stud and abutting the connector.

16. In a device of the character described, a base, a trellis erected upon the base and comprising an outer frame and a grid connecting the sides of the frame, said trellis being built up of interchangeable parts substantially as set forth and including wire sections of different diameters, sleeves, laterally apertured tubular connectors, and fastening devices such as screws and threaded studs.

17. In a trellis of the character described, the combination with a tubular section having openings through the wall thereof, a wire extending into said tube and having a portion bent angularly thereto, a brace extending across the angle of said wire and tube, a screw threaded into one of said openings for holding one end of the brace to the tube, and a slotted laterally turned foot on the other end of the brace for engaging said wire.

18. In a trellis of the character described, a wire, a pair of tubular connectors on said wire and spaced apart, said connectors having spaced lateral openings therethrough, stop screws threaded into openings in the connectors for preventing their axial movement toward each other, a perforated strip bridging the opening between the connectors, and screws securing said strip to the connectors and holding the latter from axial movement from each other.

19. The combination with a flower pot of a base, means for clamping the base to the rim of said pot, a trellis erected upon said base consisting of construction units to which other units may be added as the plant grows and extended in any direction, or from which certain units may be removed, such construction units including wire of different diameters, sleeves, and laterally apertured tubular connectors together with fastening devices such as screws and threaded studs, all substantially as set forth.

DAVIS G. WILSON.